United States Patent [19]

Nishimura

[11] Patent Number: 4,475,751
[45] Date of Patent: Oct. 9, 1984

[54] COUPLER

[75] Inventor: Kyoshin Nishimura, Saitama, Japan

[73] Assignee: Clarion Co., Ltd., Tokyo, Japan

[21] Appl. No.: 242,426

[22] Filed: Mar. 11, 1981

[30] Foreign Application Priority Data

Mar. 12, 1980 [JP] Japan .............................. 55-31031[U]

[51] Int. Cl.³ ............................................. F16L 39/00
[52] U.S. Cl. .................................... 285/131; 285/119;
285/376; 280/421; 339/15; 339/49 R
[58] Field of Search .................. 285/60, 69, 119, 376,
285/137 R, 133 R; 339/15, 10, 49 R, 177 R,
160; 280/420, 421, 422

[56] References Cited

U.S. PATENT DOCUMENTS

| 803,648 | 11/1905 | Williams | 285/68 X |
|---|---|---|---|
| 2,032,096 | 2/1936 | Petznilk | 285/68 X |
| 3,950,017 | 4/1976 | Beurer | 285/137 R |
| 4,142,742 | 3/1979 | Cornett et al. | 285/137 R X |
| 4,183,599 | 1/1980 | Wetzig | 285/68 |

Primary Examiner—Dave W. Arola
Attorney, Agent, or Firm—Russell E. Hattis

[57] ABSTRACT

A coupler comprising a female coupling member and a male coupling member adapted to be fitted therein for coupling air conduits of two systems, i.e., an air pressure supply system and a control system thereof, wherein the coupling members have openings of a first and a second air conduit, respectively, at respective central portions of the mating faces and annular grooves concentric with and outer than the respective openings; third and fourth air conduits open at the respective grooves; the openings of the first and the second air conduit are connected with each other; an o-ring is disposed at the connecting portion between sidewalls of the respective openings; the annular grooves of the respective coupling members are engaged with each other; a second o-ring is disposed at the engaging portion of outer walls of the respective grooves; and the engaging portion of the inner walls of the grooves are air-tightly sealed by the first o-ring.

1 Claim, 5 Drawing Figures

COUPLER

BACKGROUND OF THE INVENTION

Field of the Invention

This invention relates to a coupler for air piping and electrical wiring in a truck, a trailer, etc., and more particularly to a coupler having air conduits of two systems, i.e., pneumatic pressure supply system and control system thereof.

A known coupler of this type has a construction as illustrated in FIGS. 1 to 4. In the figures, 1 is a female coupling member constituting a mate of the couple. This female coupling member 1 includes a cover 2 formed generally in a cup-shape and has, at an upper portion thereof, a mating face with a male half 15 of the couple. The female member 1 further has, at an upper peripheral portion, hooks 3 extending inwardly for engaging with the male member 15 when mated therewith. The female member 1 is connected, at side portions thereof, to an electric cable 4 and two valves 5 and 6 for two air conduits, respectively. The first valve 5 is for pneumatic pressure supply and the second valve 6 is for control of pneumatic pressure.

A plurality of terminal nuts 7 are provided in the female member 1 for connection of conductors extending from the electric cable 4. A tip end of each of the terminal nuts 7 projects above the mating face of the female member 1 to provide a connecting terminal 8 for a corresponding terminal 8' of the male member 15.

The female member 1 has two air conduits 9 and 10 communicating with the valves 5 and 6, respectively. The first air conduit 9 is dog-legged and extends from the side of the female member 1 to the central portion thereof. An o-ring 11 for airtight seal is provided on the inner face of a sidewall of an opening for the first air conduit 9. At the outside of the opening of the first air conduit 9, an annular groove 12 is formed concentrically with the opening. The third air conduit 10 is formed in dogleg which extends from the side of the female member 1 and opens at a bottom portion of the groove 12. Inner and outer sidewalls 17 and 18 of the groove 12 have o-rings 13 and 14 for airtight sealing, respectively.

On the other hand, the male coupling member 15 is formed smaller than the female member 1 so as to be fitted in the female member 1. The male member 15 is also connected to an electric cable 4' and valves 5' and 6' for air conduits 9' and 10', respectively. In the figures, parts or portions of the male member corresponding to those of the female member are designated by similar numerals with apostrophe.

The male member 15 has, at peripheral portions thereof, projections 3' extending outwardly for engagement with the hooks 3 of the female member 1. To engage the projections 3' with the corresponding hooks 3, the male member 15 is first fitted into the female member 1 and the male member 15 is rotated by a given angle (from a position shown by phantom line to a position shown by solid line) so as to bring the projections 3' under the hooks 3 and bring them into engagement with the respective hooks 3.

Each of connecting terminal 8' of the male coupling member 15 for electric wiring is formed in a clip-shape so as to hold the connecting terminal 8 of the female coupling member 1 therein. The connecting terminal 8' has ends opened outwardly for facilitating receiving of the corresponding connecting terminal 8 of the female coupling.

The male coupling member 15 has a mating face at a lower portion thereof. As in the female coupling 1, an opening of the second air conduit 9' and an annular groove 12' are formed on the mating face. The opening of the second air conduit 9' is defined by a sidewall 16' projected from the mating face of the male coupling member 15 and the sidewall 16' is fitted in the opening of the first air conduit of the female coupling member 1 to couple the air conduits 9 and 9' of the respective coupling members 1 and 15. In this case, hermetic sealing of the respective air conduits is attained by the o-ring 11. An inner wall 17' and an outer wall 18' of the annular groove 12' of the male coupling member 15 are formed so as to extend from the mating face of the male coupling member 15, and the inner wall 17' and the outer wall 18' are fitted in the groove 12 so that an annular air path is formed by the mating faces of the coupling members 1 and 15. Since the third and the fourth air conduits 10, 10' open at the grooves 12, 12', respectively, the third and the fourth air conduits 10, 10' are connected to each other through the annular air path. In this case, the sealing between the sidewalls of the groove 12 of the female member 1 and the inner and the outer wall of the groove 12' of the male coupling member 12' is attained by two o-rings 13, 14, respectively.

In the conventional coupler as described above, three o-rings 11, 13, 14 are used to prevent air leakage from two systems of the air conduits 9, 10 and resultant mixing thereof. However, as the number of the o-rings increases, more space is required for providing the rings and the diameter of the coupler becomes larger. In addition, the number of recesses for accommodating the o-rings therein is also increased, which makes the structure of the entire coupler complicated.

SUMMARY OF THE INVENTION

It is therefore an object of the present invention to provide a coupler which is capable of reducing the number of o-rings from three to two to allow the construction of the coupler to be small-sized and simplified.

In accordance with the present invention, there is provided a coupler which comprises:
- a female coupling member;
- a male coupling member adapted to be fitted in said female coupling member;
- a first air conduit formed in said female coupling member;
- a second air conduit formed in said male coupling member and adapted to communicate with said first air conduit;
- a first and a second groove formed on said female and said male coupling member, respectively, at outer positions of openings of said first and said second air conduit;
- a third air-conduit communicating with said first groove of the female coupling member;
- a fourth air-conduit communicating with said second groove of the male coupling member;
- said first and said second groove being defined by outer walls and sidewalls of the first and the second air conduit, respectively;
- said outer wall of said second groove being in contact with said outer wall of said first groove;
- said sidewall of said second air conduit being in contact with said sidewall of said first air conduit;

a first o-ring disposed between the outer wall of the first groove and the outer wall of the second groove; and a second o-ring disposed between the sidewall of the first air conduit and the sidewall of the second air conduit.

DESCRIPTION OF THE EMBODIMENT

Figure 1:
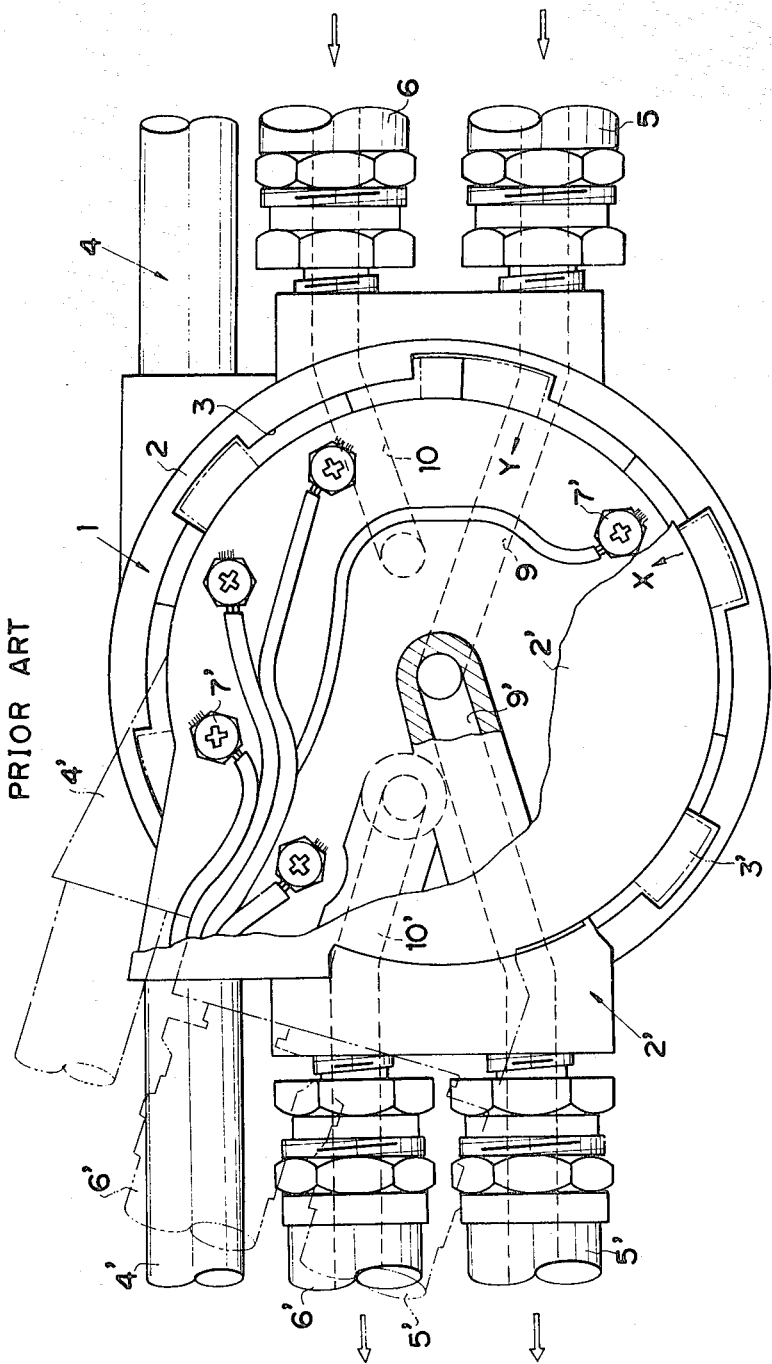
FIG. 1 is a plan view of a conventional coupler as appears after female and male coupling members are mated each other.
Figure 2:
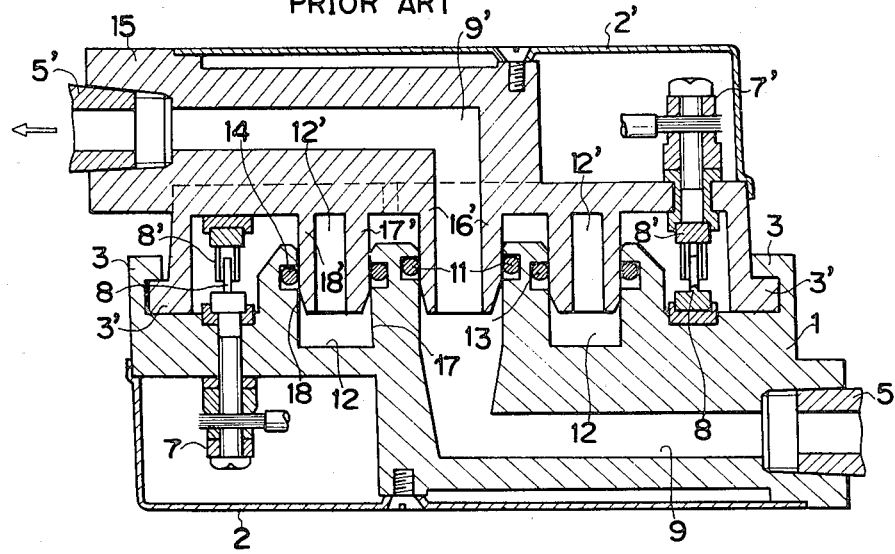
FIG. 2 is a vertical sectional view of the coupler illustrated in FIG. 1.
Figure 5:
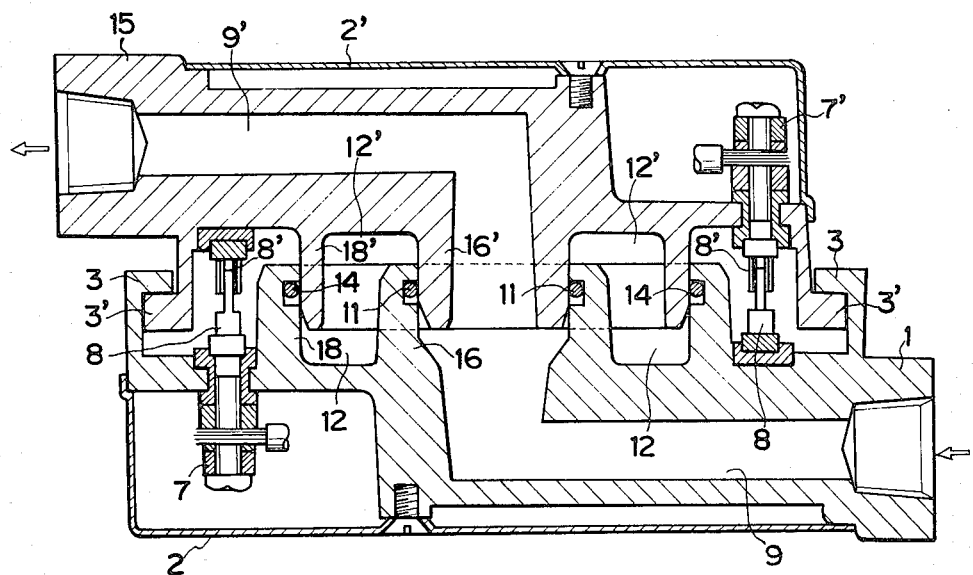
FIG. 5 is a vertical sectional view of one form of a coupler according to the present invention.
Figure 3:
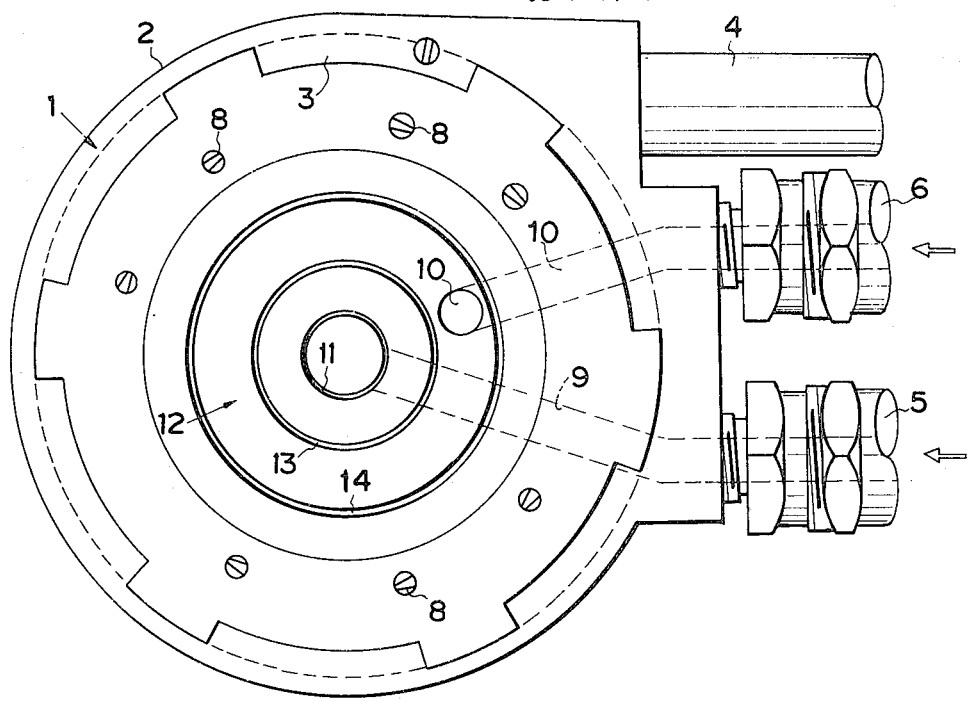
FIG. 3 is a plan view of the female coupling member.
Figure 4:
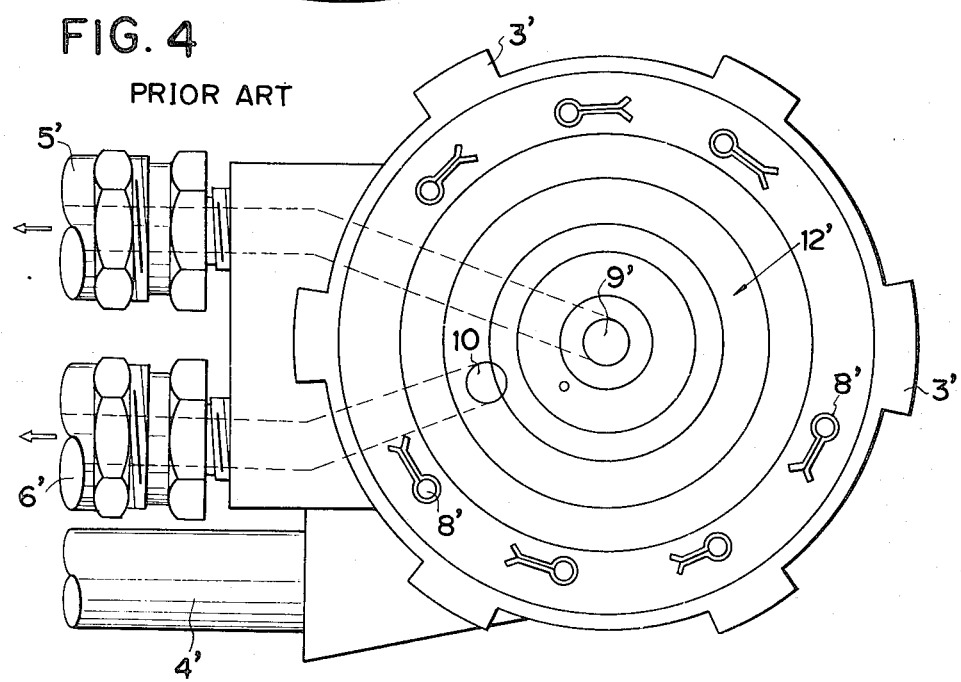
FIG. 4 is a bottom view of the male coupling member.

Referring now to FIG. 5, there is illustrated an embodiment of the present invention. Since the basic structure of the coupler according to this embodiment is substantially the same as that of the conventional coupler as described above, same numerals are used in FIG. 5 for parts and portions same as those in FIGS. 1 to 4 and the explanation thereof is omitted.

An opening of a first air conduit 9 is formed centrally on the mating face and an o-ring 11 is provided on the inner face of a sidewall 16 of the opening as in the conventional coupler. An annular groove 12 is formed outside of the opening of the first air conduit 9. A third air conduit 10 opens at the groove 12. An o-ring 14 is provided on the inner face of an outer wall 18 of the groove 12.

On the other hand, an opening for a second air conduit 9' is formed on a mating face of the male coupling member at a central position thereof. A sidewall 16' of the opening extends from the mating face and fitted in the opening of the female coupling 1. Outside of the opening of the second air conduit 9', there is formed an annular groove 12' by providing inner and outer sidewalls extended from the mating face. In the present invention, the sidewall 16' of the second air conduit 9' is used also as the inner sidewall of the groove 12'. The outer wall 18' of the groove 12' is fitted to the inner face of the outer wall 18 of the groove 12 of the female coupling member.

The coupler of the present invention has a construction as illustrated in FIG. 5. To couple the coupling member of the invention, as in the conventional manner, the coupling members are located with the mating faces of the respective members 1, 15 opposed to each other and the male coupling member 15 is, then, fitted in the female coupling member 1 and rotated by a given angle to bring the hook 3 of the coupling member 1 into engagement with the projection 3' of the male coupling member for completing the coupling of the members. Under these conditions, since the sidewalls 16' of the second air conduit 9' of the male coupling member 15 is fitted in the opening of the first air conduit 9 of the female coupling 1, the first and the second conduits 9, 9' are connected. The sealing of the conduits 9, 9' is assured by the o-ring 11 disposed between the inner face of the opening and the sidewall 16'. At the same time, the grooves 12, 12' formed on the respective coupling members 1, 15 are also coupled to each other. More specifically, the inner wall of the groove 12 of the female coupling member 1, i.e., the sidewall 16 of the opening, is fitted in the groove 12' of the male coupling 15, and the outer wall 18' of the groove 12' of the male coupling member 15 is fitted in the groove 12 of the female coupling 1. The sealing within the grooves 12 and 12' at its inner side is assured by the o-ring 11 provided at the connecting portion of the first and the second air conduits 9, 9' and the sealing within the grooves 12 and 12' at its outer side is assured by another o-ring provided between the outer walls 18, 18' of the grooves 12 and 12'.

As illustrated in the embodiment, according to the present invention, the o-ring for connection between the first and the second air conduits is also used for connection of inner portions of the grooves for coupling the third and fourth air conduits, so that the number of o-rings required for the coupler is reduced to two. As a result, the space for the o-ring can be reduced and the entire size of the coupler can also be reduced. With the reduction in number of the o-rings, the cost of the coupler can be curtailed.

I claim:

1. A coupler which comprises:
 a female coupling member;
 a male coupling member adapted to be fitted in said female coupling member;
 a first air conduit formed in said female coupling member;
 a second air conduit formed in said male coupling member and adapted to communicate with said first air conduit;
 a first groove formed on said female coupling member at a position outside of said first air conduit;
 a second groove formed on said male coupling member at a position outside of said second air conduit;
 a third air conduit in said female coupling member communicating with said first groove;
 a fourth air conduit in said male coupling member communicating with said second groove, said first groove being defined by an outer wall formed on said female coupling member at a position outside of the opening of said first air conduit and a side wall thereof;
 said second groove being defined by an outer wall formed on said male coupling member at a position outside of the opening of said second air conduit and a side wall thereof;
 said outer wall of said second groove being in contact with said outer wall of said first groove;
 said sidewall of said second air conduit being in contact with said sidewall of said first air conduit;
 a first O-ring disposed between the outer wall of the first groove and the outer wall of the second groove; and
 a second O-ring disposed between the sidewall of the first air conduit and the sidewall of the second air conduit so that said first and second O-rings provide a complete isolating and sealing action for said first and second conduits and for said third and fourth conduits.

* * * * *